United States Patent [19] [11] 3,919,270
Kirschnek et al. [45] Nov. 11, 1975

[54] POLYAMINE DERIVATIVES

[75] Inventors: Helmut Kirschnek, Leverkusen; Hans Görlich, Cologne, both of Germany

[73] Assignee: Bayer Aktiengesellschaft, Leverkusen-Bayerwerk, Germany

[22] Filed: Feb. 9, 1973

[21] Appl. No.: 331,176

[30] Foreign Application Priority Data
Feb. 10, 1972 Germany............................ 2206302

[52] U.S. Cl. .................. 260/404.5; 8/130.1; 8/131; 252/8.6; 252/8.8
[51] Int. Cl.²........................................ C07C 103/30
[58] Field of Search ................................. 260/404.5

[56] References Cited
UNITED STATES PATENTS

| | | | |
|---|---|---|---|
| 3,055,924 | 9/1962 | Hiestand | 260/404.5 |
| 3,284,416 | 11/1966 | Kamal | 260/404.5 X |
| 3,517,039 | 6/1970 | Wagner et al. | 260/404.5 |

*Primary Examiner*—Ethel G. Love
*Attorney, Agent, or Firm*—Plumley & Tyner

[57] ABSTRACT

New polyamine derivatives of the formula

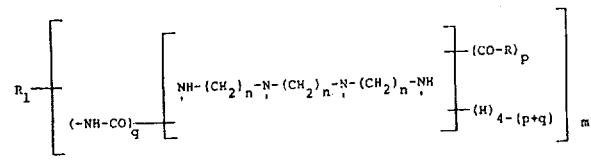

in which $R$, $R_1$, $m$, $n$, $p$ and $q$ have the measuring given below in the disclosure and a process for their manufacture. The polyamines are useful as textile plasticisers for synthetic fibres, preferably polyacrylonitrile fibre materials.

7 Claims, No Drawings

POLYAMINE DERIVATIVES

The invention relates to polyamine derivates; more particularly it concerns new polyamine derivatives of the formula

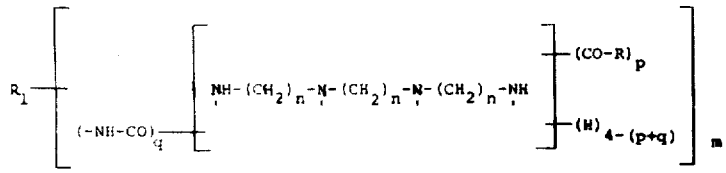

in which
R denotes a $C_{11}$–$C_{23}$-alkyl radical, preferably a $C_{17}$–$C_{21}$-alkyl radical and
$R_1$ denotes the radical of an araliphatic, aromatic or, preferably, aliphatic monoisocyanate or diisocyanate which is left after removing the isocyanate groups,
$m$ is 1 or 2 and
$n$ is 2 or 3, and
$p$ has a value of between 1.9 and 3.2, preferably 2.4 and 3, with the proviso that
the sum $p + q$ has a value between 3 and 4, preferably between 3.2 and 3.9, and the ratio $p:q$ is 1:0.25–0.6, preferably 1:0.3–0.4,
a process for their manufacture and their use as textile plasticisers for synthetic fibres, preferably polyacrylonitrile fibre materials.

For R, $C_{11}$–$C_{23}$-alkyl radicals which may be mentioned are the undecyl, tridecyl and pentadecyl radical and especially $C_{17}$–$C_{21}$-alkyl radicals, such as the heptadecyl, octadecyl, eicosyl and above all the heneicosyl radical.

For $R_1$, the following may be mentioned as examples of radicals which remain after removal of the isocyanate groups: the aralkyl radicals, optionally substituted by methyl groups, which remain from araliphatic monoisocyanates or diisocyanates, such as benzylisocyanate and m-xylylene-diisocyanate, such as the benzyl radical or xylylene radical; the aryl radicals, optionally substituted by halogen atoms or $C_1$–$C_4$-alkyl groups, which remain from aromatic monoisocyanates or diisocyanates, such as phenylisocyanate, tolylisocyanate, 3-chlorophenylisocyanate, phenylene-1,4-diisocyanate, toluylene-2,4-diisocyanate, 4,4'-bis-isocyanato-diphenylmethane and 2,2-bis-(4-isocyanatophenyl)-propane, such as the phenyl, tolyl and 3-chlorophenyl radical and also arylene radicals, such as the 1,4-phenylene, 2,4-toluylene, bisphenylenemethane and 2,2-bis-phenylenepropane radical; the $C_1$–$C_{18}$-alkyl radicals, optionally substituted by halogen atoms or $C_1$–$C_4$-alkoxy groups, which remain from aliphatic monoisocyanates or diisocyanates, such as methyl-, methoxymethyl-, ethyl-, methoxyethyl-, propyl-, chloropropyl-, butyl-, pentyl-, hexyl-, cyclohexyl-, dodecyl- and octadecylisocyanate and from tetramethylene-, hexamethylene- and cyclohexane-1,4-diisocyanate, such as the methyl, methoxymethyl, ethoxymethyl, ethyl, methoxyethyl, propyl, chloropropyl, butyl, pentyl, hexyl, cyclohexyl, dodecyl and octadecyl radical and also the $C_4$–$C_8$-alkylene radicals, such as the tetramethylene, hexamethylene and 1,4-cyclohexylene radical, with the tetramethylene, hexamethylene and cyclohexylene radicals as well as the $C_1$–$C_6$-alkyl radicals substituted by $C_1$–$C_4$-alkoxy groups being particularly preferred.

The manufacture of the polyamine derivatives according to the invention, of the formula (I), is effected by reacting acylated polyamines of the formula

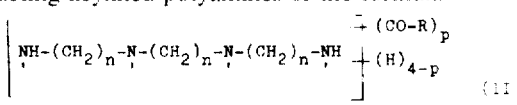

in which
R, $n$ and $p$ have the meaning indicated under the formula (I)
with isocyanates of the formula $$R_1(NCO)_m \qquad (III)$$

in which
$R_1$ and $m$ also have the meaning indicated under the formula (I)
under the reaction conditions which are in themselves known for the reaction of isocyanates with amines, in such molar ratios that the sum of $p + q$ has a value of between 3 and 4, preferably 3.2 and 3.9, and the ratio $p:q$ is 1:0.25–0.6, preferably 1:0.3–0.4.

The reaction, according to the invention, of the acylated polyamines of the formula (II) with the isocyanates of the formula (III) is carried out, for example, at temperatures of 20°–120°C, if appropriate in organic solvents which are inert towards isocyanate groups, such as hydrocarbons, for example heptane, benzene, toluene or xylene, or halogenated hydrocarbons, for example tetrachloroethylene or chlorobenzene. If the reaction is carried out in the absence of organic solvents, temperatures of 100°–120°C are preferably used; if, on the other hand, it is carried out in organic solvents, temperatures of 40°–80°C have proved successful.

The acylated polyamines of the formula (II) to be used as starting materials are in themselves known. They are obtained by acylation of polyamines of the formula $$H_2N-(CH_2)_n-NH-(CH_2)_n-NH-(CH_2)_n-NH_2 \qquad (IV)$$

in which
$n$ has the meaning indicated under the formula (I)
with carboxylic acids of the formula $$R-COOH$$

in which
R has the meaning indicated under the formula (I) or of their derivatives capable of amide formation, such as carboxylic acid halides, especially carboxylic acid chlorides, carboxylic acid anhydrides, or lower alkyl esters of the carboxylic acids, such as methyl or ethyl esters, in a manner which is in itself known, for example by heating the components for several hours to higher temperatures, for example 140°–180°C, if appropriate under reduced pressure. The degree of acylation is found by determining the acid number (mg of KOH/1 g of product) of the reaction mixture.

The polyamine derivatives according to the invention, of the formula (I), are hard waxy products of which the melting point is approximately between 90° and 120°C. They are insoluble in water but can nevertheless be converted into storagestable emulsions, with solids contents of up to 30 per cent by weight, in water by means of the known emulsifiers, without the conjoint use of organic solvents and in a simple manner, that is to say without requiring special mechanical devices such as turbine stirrers, homogenising machines and the like; these emulsions in turn display the advantageous property that they can be diluted as desired by simply pouring into cold or warm water and do not, as is usual, require prior dissolving under warm conditions.

The polyamine derivatives of the formula (I) according to the invention are excellent textile plasticisers, especially for textile materials of synthetic fibres, such as polyesters, for example cellulose 2½-acetate, cellulose triacetate, polyethylene terephthalates, polycyclohexanedimethylene terephthalate or polycarbonates; synthetic polyamides, for example polyhexamethylenediamine adipate, poly-ε-caprolactam or poly-ω-aminoundecanoic acid and especially polyacrylonitrile.

The textile materials can be in the most diverse states of processing, for example in the form of woven fabrics, knitted fabrics, tapes, flocks, fleeces or made-up goods.

The plasticisers according to the invention can be applied both in accordance with the customary exhaustion processes and in accordance with the customary impregnating processes, with the polyamine derivatives being used in organic solvents, for example tetrachloroethylene, or preferably in aqueous emulsions.

The polyamine derivatives according to the invention are advantageously employed in such amounts that the treated textile material displays a deposit of about 0.02–1, preferably 0.2–0.8, per cent by weight of plasticiser (I).

When using the polyamine derivatives according to the invention in the exhaustion process, the textile materials to be finished are agitated in the treatment baths, for example at temperatures of 30°–110°C, for 20 to 120 minutes, using a liquor ratio of 1:5–1:50. After removing the liquor, the finished material is dried.

Because of the high stability of salt of the aqueous emulsions of the polyamine derivatives according to the invention, which remains preserved even up to near the boiling point of the emulsions, the plasticisers according to the invention can not only be employed in the post-treatment of dyed materials but also directly in the dye baths (single-bath dyeing-finishing process). This use in dye baths furthermore is attractive because the polyamine derivatives according to the invention, in spite of their high substantivity, show no retarding action towards cationic dyestuffs. They impair neither the speed of absorption nor the exhaustion of the bath of the cationic dyestuffs so that both deep full colour shades and black dyeings can be produced in their presence. The high fastness to rinsing of the plasticiser effects achieved with the compounds according to the invention additionally favours the applicability of the products in the single-bath dyeing-finishing process.

Because of their insensitivity towards oxidising agents, such as sodium chlorite, the plasticisers can also be used in bleaching baths. Since they furthermore do not impair the brightening action of cationic whitening agents, the plasticisation and whitening of grey goods of, for example, polyacrylonitrile can be carried out directly in the bleaching bath with the aid of the compounds according to the invention.

The treatment of the textile materials with the compounds according to the invention gives the textiles a pleasantly soft slightly greasy handle. The improved fibre-to-fibre slip achievable by means of the treatment furthermore results in reduced friction and hence in a distinctly reduced electrostatic charge when using the finished goods.

In the case of articles of texturised polyamide the treatment with the compounds of the formula (I) according to the invention produces optimum effects with regard to crease resistance and springy elasticity. It should be emphasised that the plasticiser effects achievable not only display good fastness to rinsing but also a certain resistance to washing towards the mild wet washes which are customary for synthetic fibres. The utility of the textile materials is increased on treatment with the compounds according to the invention. For example, knitted goods of high bulk polyacrylic yarns retain the pleasing wool-like handle character after repeated mild washes whilst this is not the case when using the known plasticisers. The plasticisers according to the invention display good compatibility with other textile auxiliaries so that they can, for example, also be combined with other plasticisers.

For emulsifying the polyamine derivatives according to the invention, mixtures of the known cationic and non-ionic emulsifiers are appropriately used, and advantageously a small amount of lower aliphatic carboxylic acid is also added to the mixtures.

Possible cationic emulsifiers are above all quaternary ammonium, sulphonium or phosphonium compounds, for example N-hexadecylpyridinium bromide, N-tetradecyl-N-dimethyl-N-benzylammonium chloride, N-stearoylamidopropyl-N-dimethyl-N-$\beta$-hydroxyethylammonium phosphate, dodecyltrimethylphosphonium chloride and dodecyldimethylsulphonium chloride.

Non-ionic emulsifiers which have proved particularly successful are polyglycol-ether derivatives such as are derived, for example, from fatty alcohols, fatty acids, fatty amines and alkylphenols. The degree of ethoxylation of the compounds is advantageously between 6 and 50 mols of ethylene oxide. Ethoxylation products of fatty alcohols are preferentially employed.

The following may be mentioned as examples of lower aliphatic carboxylic acids: formic acid, acetic acid, propionic acid and glycollic acid.

The manufacture of the stock emulsions from the polyamine derivatives according to the invention is advantageously effected by warming 10–30 parts of polyamine derivative with 0.2–3 parts of a cationic emulsifier and 0.2–3 parts of a non-ionic emulsifier and also 0.3–5 parts of lower aliphatic carboxylic acid and 70–90 parts of water to 90°–95°C until a homogeneous mixture has been produced, and then again cooling the mixture to room temperature; at times, a further warming to 90°C may be advisable.

German Pat. Specification No. 1,201,805 and Belgian Pat. Specification No. 573,541 have already disclosed acylated polyamines as textile plasticisers and French Pat. Specification No. 1,295,047 has already disclosed reaction products of polyamines with fatty acids as textile plasticisers. The polyamine derivatives according to the invention are distinguished, relative to these known compounds, by better emulsifiability and by the fact that they yield more wash-resistant plasticiser effects and do not exert any retarding effect on cationic dyestuffs in the dye bath, and that the emulsions manufactured from them display greater stability and improved stability to salt.

EXAMPLE 1 a. 84 g (0.5 mol) of hexamethylenediisocyanate are added dropwise to the melt of 966 g (1 mol) of the condensation product, described below, of 1 mol of triethylenetetramine and 2.6 mols of technical behenic acid, contained under a nitrogen atmosphere in a flask provided with a reflux condenser, whilst stirring at 111°–118°C. After completion of the addition of isocyanate the reaction mixture is stirred for approximately a further 15 minutes at the same temperature and is subsequently cooled.

1,045 g of a light yellow hard waxy reaction product are obtained; solidification point: 110°–112°C.

b. The condensation product of triethylenetetramine and technical behenic acid employed as the starting compound had been obtained as follows:

867 g (2.6 mols) of technical behenic acid (average molecular weight: 334; mixture of 2% of C-24, 80% of C-22, 12% of C-20, 5% of C-18 and 1% of C-16 fatty acid) were fused in a nitrogen atmopshere. 146 g of triethylenetetramine (1 mol) were added dropwise to the melt, warmed to 180°–185°C, whilst stirring and distilling off the water of reaction which forms. Thereafter the reaction mixture was stirred for 2 hours in vacuo (40 mm Hg) at the same temperature and was then cooled to room temperature.

Yield: 945 g of a light yellow waxy product; solidification point: 104°C; acid number 5.

c. A mixture of 180 g of the polyamine reaction product described under a), 10 g of N-tetradecyl-N,N-dimethyl-N-benzylammonium chloride, 5 g of the reaction product of 1 mol of oleyl alcohol with 20 mols of ethylene oxide, 30 g of glacial acetic acid and 775 g of water is warmed to 95°C in a stirred apparatus equipped with a reflux condenser, stirred for 30 minutes at this temperature, then cooled to 40°C, again warmed to 90°C and again cooled to room temperature. A mobile, storage-stable emulsion is obtained.

If in Example 1 (a), instead of the fatty acid - polyamine condensation product used there, 1 mol of the condensation product listed in Column A of the table which follows is employed, and instead of the hexamethylenediisocyanate used the isocyanate listed in Column B of the table is employed in the molar amount also indicated in Column B, polyamine reaction products are obtained, the physical properties of which are indicated in Column C and D of the table.

The condensation products listed in Column A, which are characterised by the fatty acids and polyamines used for their manufacture and by the molar amounts employed, were manufactured analogously to Example 1 (b).

The emulsification of the polyamine acylation products obtained was effected as described in Example 1 (c).

Table

| Example No. | A — Condensation product of x mols of fatty acid and y mols of polyamine | | B — z mols of isocyanate | C — Reaction product Solidification point °C | D — Appearance |
|---|---|---|---|---|---|
| 2 | 2.8 | stearic acid | 1 methylisocyanate | 90–92 | light yellow hard wax |
|   | 1.0 | triethylenetetramine |   |   | " |
| 3 | 2.6 | arachidic acid | 1 methylisocyanate | 100–102 |   |
|   | 1.0 | triethylenetetramine |   |   | " |
| 4 | 1.4 | stearic acid | 1 methylisocyanate | 98–100 |   |
|   | 1.4 | behenic acid |   |   |   |
|   | 1.0 | tripropylenetetramine |   |   |   |
| 5 | 2.8 | behenic acid technical+ | 1 methylisocyanate | 110–112 | " |
|   | 1.0 | triethylenetetramine |   |   |   |
| 6 | 2.7 | behenic acid+ | 1 ethylisocyanate | 110–112 | " |
|   | 1.0 | triethylenetetramine |   |   |   |
| 7 | 3.0 | behenic acid+ | 0.8 propylisocyanate | 111–113 | " |
|   | 1.0 | triethylenetetramine |   |   |   |
| 8 | 2.2 | behenic acid+ | 1.4 tert.-butylisocyanate | 110–112 | " |
|   | 1.0 | triethylenetetramine |   |   |   |
| 9 | 2.5 | behenic acid+ | 1.1 hexylisocyanate | 111–113 | " |
|   | 1.0 | triethylenetetramine |   |   |   |
| 10 | 2.4 | behenic acid+ | 0.8 octadecylisocyanate | 114–116 | " |
|   | 1.0 | triethylenetetramine |   |   |   |
| 11 | 2.5 | behenic acid+ | 1.0 ethoxymethylisocyanate | 110–112 | " |
|   | 1.0 | triethylenetetramine |   |   |   |
| 12 | 2.6 | behenic acid+ | 1.0 methoxymethylisocyanate | 110–112 | light yellow hard wax |
|   | 1.0 | triethylenetetramine |   |   | " |
| 13 | 2.6 | behenic acid+ | 1.0 methoxyethylisocyanate | 110–112 |   |
|   | 1.0 | triethylenetetramine |   |   |   |
| 14 | 2.7 | behenic acid+ | 1.0 phenylisocyanate | 109–111 | light brown hard wax |
|   | 1.0 | triethylenetetramine |   |   |   |
| 15 | 2.7 | behenic acid+ | 0.6 tetramethylene-1,4-diisocyanate | 112–113 | light yellow hard wax |
|   | 1.0 | triethylenetetramine |   |   | " |
| 16 | 2.5 | behenic acid+ | 0.7 hexamethylene-1,6-diisocyanate | 112–113 |   |
|   | 1.0 | tripropylenetetramine |   |   |   |
| 17 | 2.6 | behenic acid+ | 0.5 phenylene-1,4-diisocyanate | 111–112 | light brown hard wax |
|   | 1.0 | triethylenetetramine |   |   | " |
| 18 | 2.4 | behenic acid+ | 0.5 diphenylene-4,4'-diisocyanate | 109–111 |   |
|   | 1.0 | triethylenetetramine |   |   | " |
| 19 | 2.5 | behenic acid+ | 0.5 m-xylylenediisocyanate | 110–112 |   |
|   | 1.0 | tripropylenetetramine |   |   |   |
| 20 | 2.6 | behenic acid+ | 0.6 cyclohexane-1,4-diisocyanate | 112–114 | light yellow hard wax |
|   | 1.0 | triethylenetetramine |   |   |   |

+technical behenic acid, for composition see Example 1(b).

EXAMPLE 21

Polyacrylonitrile high bulk yarn which has been dyed in the usual manner with basic dyestuffs is treated for about 20 minutes at 40°C, using a liquor ratio of 1:40, in a bath which per litre contains 0.7 g of the emulsion described in Example 1 (c) (18% active substance content) and 0.5 g of 60% strength acetic acid. Thereafter the yarn is freed of the treatment liquor by centrifuging and is dried at 60°C.

The treated yarn shows a pleasantly soft, slightly greasy handle which is largely stable to repeated washing at 30°C with a customary fine detergent.

A yarn with an equivalent finish was also obtained if instead of the emulsion according to Example 1 (c) which was used, the same amount of one of the emulsions according to Example 7 (c), 10 (c), 11 (c) or 12 (c) was employed.

EXAMPLE 22

Polyacrylonitrile high bulk hank material is introduced, using a liquor ratio of 1:40, into a bath warmed to 80°C which per litre contains 1 g of the basic dyestuff No. 11,085 (Colour Index, 3rd. edition), 2.5 g of sodium sulphate, 0.5 g of 60% strength acetic acid, 0.25 g of the reaction product of 1 mol of oleyl alcohol and 50 mols of ethylene oxide and 0.5 g of the emulsion described in Example 1 (c). The dye bath is heated to 98°C over the course of 30 minutes and is kept at this temperature for 90 minutes. The bath is cooled to 40°C by slowly running in cold water. The goods are then rinsed with cold water, dewatered by centrifuging and finally dried at 60°C.

A yarn dyed deep red is obtained which is distinguished by a pleasant soft handle which is largely resistant to repeated fine washes at 30°–35°C with a commercially available fine detergent.

It should be mentioned that during the single-bath dyeing-finishing process no flocculation occurs in the dye bath and that the affinity of the dyestuff is in no way impaired by the addition of plasticiser.

Emulsions according to Example 11 (c), 12 (c), 13 (c) and 16 (c) can also be used with equal success as the emulsion according to Example 1 (c).

EXAMPLE 23

A furnishing fabric weighing 280 g/m$^2$, of polyacrylonitrile fibres, is introduced, in the liquor ratio of 1:40, into a bath at room temperature which contains, per litre, 1.1 g of the basic dyestuff No. 51,005 (Colour Index, 2nd. edition), 0.6 g of 60% acetic acid, 0.2 g of the reaction product of 1 mol of oleyl alcohol and 50 mols of ethylene oxide and 0.5 g of the emulsion described in Example 6 (c). The bath is warmed to 80°C over the course of 35 minutes and to 98°C over the course of a further 60 minutes and is kept at this temperature for 60 minutes. The dye bath is cooled to about 40°C by running in cold water. The goods are then rinsed with cold water, largely dewatered by squeezing out and finally dried at 100°C.

The piece goods, dyed dark blue, obtained by the single-bath dyeing-finishing process, are free of creases and breaks and show a very soft, full handle. This is resistant to repeated washing at 30°–35°C with a commercially available fine detergent.

During dyeing, no flocculation occurs in the dye bath and the affinity of the dyestuff is in no way impaired by the addition of the plasticiser.

A fabric with an equivalent finish was also obtained if instead of the polyamine derivative emulsion according to Example 6 (c), which was used, the same amount of one of the emulsions according to Example 5 (c), 9 (c), 11 (c), 16 (c) or 17 (c) was employed.

EXAMPLE 24

Flocks of polyacrylonitrile fibres are introduced, using a liquor ratio of 1:10, into a bath at 75°C which per litre contains 3 g of the basic dyestuff No. 48,060 (Colour Index, 2nd. edition), 3 g of sodium sulphate, 1.5 g of 60% strength acetic acid, 0.2 g of the reaction product of 1 mol of oleyl alcohol and 50 mols of ethylene oxide and 0.5 g of the emulsion described in Example 11 (c). The bath is heated to a temperature of 98°C over the course of 35 minutes and kept at this temperature for 90 minutes. The bath is then cooled to 45°C by running in cold water. The flocks are then rinsed with cold water, centrifuged to a residual moisture content of 20% and finally dried at a temperature of 60°–80°C.

A soft flock material dyed in a full yellow is obtained, which shows excellent spinnability.

In order further to improve the anti-static properties and increase the fibre adhesion, the dyed and treated flock is post-treated at 35°C in a bath which per litre contains 3 g of dibutylphosphoric acid (diethanolamine salt). The removal of the excess liquor and the drying of the material takes place as described above.

The pleasantly soft, slightly greasy handle of the flock material is not impaired by this subsequent anti-static finish.

A material with an equivalent finish is also obtained if instead of the polyamine derivative emulsion according to Example 11 (c) which was used, the same amount of one of the emulsions according to Example 1 (c), 4 (c), 8 (c), 9 (c) or 17 (c) is employed.

EXAMPLE 25

Undyed polyacrylonitrile high bulk hank material is introduced, in a liquor ratio of 1:40, into a bath at 70°–75°C which per litre contains 0.35 g of 50% strength sodium chlorite, 0.5 g of crystalline oxalic acid, 0.3 g of a chlorite-resistant cationic whitener (for example BLANKOPHOR ACB/Bayer) and 0.5 g of the emulsion described in Example 15 c. The bath is warmed to 98°C over the course of 30–45 minutes and is kept at this temperature for 30 minutes. Thereafter the bath is cooled to 40°C by running in cold water. The goods are then rinsed with cold water, dewatered to a residual moisture content of 20% by centrifuging and finally dried at a temperature of 60°C.

The high bulk yarn which has in this way been simultaneously bleached, whitened and plasticised shows a high degree of whiteness and a pleasantly soft, slightly greasy handle. In winding and knitting the yarn is further distinguished by excellent processing characteristics.

A material with an equivalent finish was also obtained if instead of the polyamine derivative emulsion according to Example 15 (c) which was used, the same amount of one of the emulsions according to Example 3 (c), 5 (c), 10 (c), 12 (c), 16 (c) or 20 (c) was employed.

EXAMPLE 26

Knitted goods of texturised poly-ε-caprolactam, dyed with dispersion dyestuffs are treated for 20 minutes, using a liquor ratio of 1:25, in a bath at 40°–45°C which per litre contains 1 g of the emulsion described in Example 12 (c) and is adjusted to a pH value of 6 with acetic acid. Thereafter the goods are dewatered by centrifuging and dried at a temperature of 90°C. The knitted goods thus obtained possess a pleasant soft handle and display optimum crease resistance and springy elasticity for this article. The effects achieved are largely resistant to repeated washing at 30°–35°C with a commercially available fine detergent.

A polyamide knitted fabric with an equivalent finish was also obtained if instead of the polyamine derivative emulsion according to Example 12 (c) which was used, the same amount of one of the emulsions according to Example 9 (c), 11 (c), 15 (c) or 16 (c) was employed.

We claim:

1. Polyamine derivative of the formula

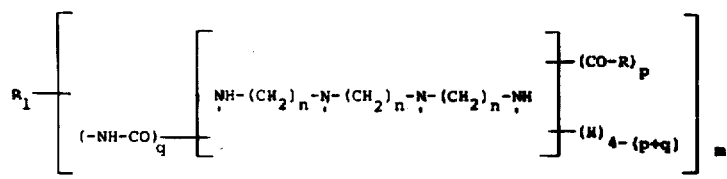

in which
R is $C_{11}$–$C_{23}$-alkyl;
$R_1$ is benzyl; xylylene; phenyl; phenylene, phenyl or phenylene substituted with $C_1$–$C_4$-alkyl or halogen; bis-phenylenemethane; 2,2-bis-phenylene propane; $C_1$–$C_{18}$-alkyl; $C_1$–$C_{18}$-alkyl substituted by halogen or $C_1$–$C_4$-alkoxy; $C_4$–$C_8$-alkylene; or cyclohexylene;
$m$ is 1 or 2;
$n$ is 2 or 3;
$p$ has a value between 1.9 and 3.2, with the proviso that the sum $p+q$ has a value between 3 and 4; and the ratio of $p:q$ is 1:0.25–0.6.

2. The polyamine derivative of claim 1 in which R is $C_{17}$–$C_{21}$-alkyl.

3. The polyamine derivative of claim 1 in which $R_1$ is $C_1$–$C_{18}$-alkyl; $C_1$–$C_{18}$-alkyl substituted by halogen or $C_1$–$C_4$-alkoxy; $C_4$–$C_8$-alkylene; or cyclohexylene.

4. The polyamine derivative of claim 1 in which $R_1$ is tetramethylene, hexamethylene, cyclohexylene or $C_1$–$C_6$-alkyl substituted by $C_1$–$C_4$-alkoxy.

5. The polyamine derivative of claim 2 in which $R_1$ is $C_1$–$C_{18}$-alkyl; $C_1$–$C_{18}$-alkyl substituted by halogen or $C_1$–$C_4$-alkoxy; $C_4$–$C_8$-alkylene; or cyclohexylene.

6. The polyamine derivative of claim 2 in which $R_1$ is tetramethylene, hexamethylene, cyclohexylene or $C_1$–$C_{18}$-alkyl substituted by $C_1$–$C_4$-alkoxy.

7. The polyamine derivative of claim 1 in which $p$ has a value between 2.4 and 3, with the proviso that the sum $p+q$ has a value between 3.2 and 3.9 and the ratio $p:q$ is 1:0.3–0.4.

* * * * *